March 14, 1944.  M. WAGNER  2,344,378
CHASSIS ESPECIALLY FOR MOTOR VEHICLES
Filed March 22, 1939
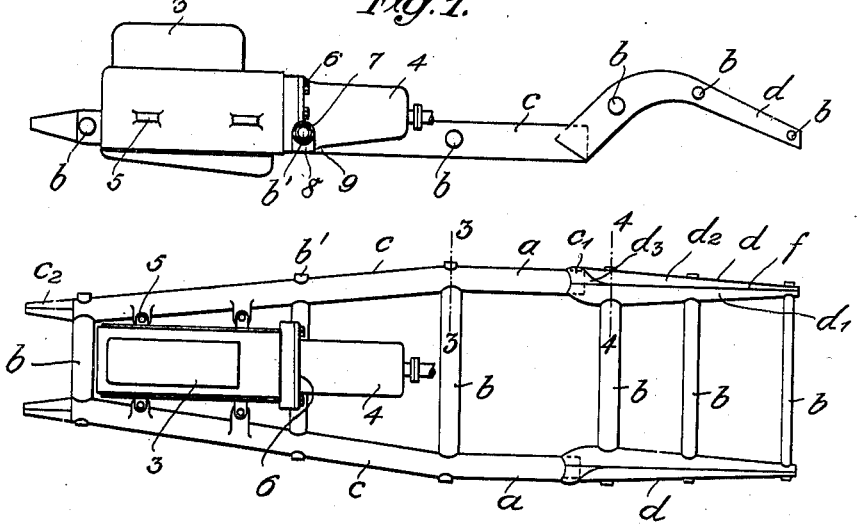
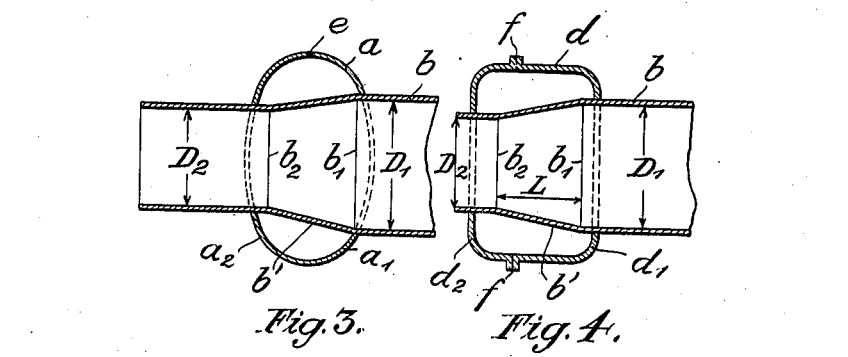
INVENTOR:
MAX WAGNER
BY Haseltine, Lake & Co.
ATTORNEYS Patented Mar. 14, 1944

2,344,378

UNITED STATES PATENT OFFICE 2,344,378

CHASSIS, ESPECIALLY FOR MOTOR VEHICLES

Max Wagner, Stuttgart, Germany; vested in the Alien Property Custodian

Application March 22, 1939, Serial No. 263,333
In Germany April 22, 1938

24 Claims. (Cl. 280—106)

This invention relates to improvements in the construction of chassis for vehicles, especially for motor vehicles. It consists essentially in that the longitudinal members of the chassis comprise on the one hand a practically straight (straight or only slightly outwardly bent) section of one-piece tubular cross-section and on the other hand of a cranked section (especially in the region of the rear axle) the cranked section being formed by at least two pressings which are welded together by longitudinal seams to form a closed cross-section.

Experience has shown, that such chassis built-up of several sections, contrary to first expectations, are in no way weakened by the subdivision, but, on the contrary, possess considerable advantages not only as regards the process of production but also as regards strength.

Owing to the fact, that the straight or substantially straight portion of the frame is formed of a tube of one-piece cross-section, a considerable simplification and cheapening of the chassis is attained. On the other hand, as the rear cranked part is not made also of such one-piece tubes, the objection is obviated that a complicated shaping of the tube is necessary which would also be detrimental for the strength of the chassis.

Moreover owing to the fact that merely that part of the frame which is sharply bent or has a changing cross-section, is composed of several sheet metal pressings, the objection is avoided that the sheet-metal pressings are of very large dimensions, which would require exceptionally large shaping forces and very large machines and pressing dies. With the relatively small dimensions used according to the invention the pressings can be produced without difficulty and advantageously. By suitably welding the pressings and suitably connecting the different sections of the longitudinal chassis members very high strength properties are obtained.

The invention combines the advantage of easy production with the advantage of great strength of the chassis, without the disadvantages of complicated and expensive shaping of tubes and the disadvantages of large pressings.

The invention also relates to a particularly advantageous connection of the two longitudinal member sections resisting bending and torsional stresses.

The invention furthermore relates to a joint between longitudinal and cross chassis members of closed, for example, box-shaped or tubular cross-section, especially for motor vehicles, and insofar consists substantially in that at least one member (particularly a cross member) extends through at least one other member (particularly a lateral longitudinal member) and is reduced in cross section between the two walls of the latter in such a manner that it possesses a larger passage cross section on the side subjected to the heavier load, that is on the inner side, than on the side subjected to the lighter load, that is on the outer side. The penetrating chassis member is welded on its entire periphery to both walls of the chassis member through which it extends.

A further object of the invention is to increase the strength and stiffness of the connection of the chassis members without the pierced chassis member being weakened by unnecessarily large holes for the passage of the other chassis member. At the same time the reduction in cross-sectional area of the penetrating chassis member represents a saving in weight and material.

The invention finally consists in the provision of tunnel-like passages in those parts of the vehicle which are in the way of the cross-members, for example the chassis members located within the range of the engine and change gears viz, the casings of the driving parts of the engine pass through these. The housing of a driving aggregate consisting of engine and change gear is preferably provided with tunnel-like passages at the joint between the engine and the change-gear flanged thereto through which passages the chassis cross members extend freely. The tunnel-like passages are preferably closed at the bottom by a supporting bridge for the gear case.

This arrangement possesses the advantage that the chassis members need not be bent in proximity to the driving aggregate so that their torsional resistance is fully preserved. This is of particularly great advantage for tubular chassis members. Furthermore, the height at which the bearings of the engine and change gear are located is in no way influenced by the girders, and moreover no vibrations are transmitted from the drive directly to the chassis tubes, and inversely the housing of the drive is protected against the torsional stresses of the chassis.

It is of course also possible to combine the shown combination of the parts of the longitudinal members with the provision of the tunnel-like passages for the cross members with the passing of at least one member, preferably a cross member, through at least one other member, preferably a lateral longitudinal member, especially as shown above for this latter feature.

Other features and advantages of the invention are disclosed in the construction hereinafter described by way of example with reference to the accompanying drawing, in which:

Fig. 1 shows a chassis in side elevation,
Fig. 2 is a top plan view of Fig. 1,
Fig. 3 is a cross-section on line 3—3 of Fig. 2,
Fig. 4 is a cross-section on line 4—4 of Fig. 2.

The chassis consists of two longitudinal members $a$ and of tubular cross members $b$. Each of the longitudinal members is built up of a front section $c$ of oval cross-section and extending substantially straight from its front end to near the rear wheels of the vehicle and of a rear section $d$ which extends over the rear wheels in a strong bend.

The cross members, as shown particularly in Figs. 3 and 4, extend through the longitudinal members and are welded thereon on both their passage cross-sections $b_1$ and $b_2$, the passage cross-section $b_1$ on the inner side of the longitudinal member being larger than the passage cross-section $b_2$ on the outer side thereof.

The front section $c$ of the longitudinal chassis member is formed from a plate rolled into a tube of oval cross-section, the abutting edges of the rolled tube being welded together by a longitudinal seam $e$ (Fig. 3).

The rear, strongly bent section $d$ is formed by two U-shaped pressings $d_1$ and $d_2$ each having short flanges $f$ by which they are welded together by means of a lower and upper longitudinal seam in such a manner that they form members with a closed substantially box-shaped cross-section.

The front member section $c$ is connected to the rear member section $d$ in such a manner that the tubular end $c_1$ of the member section $c$ is introduced obliquely and laterally into the abruptly rising portion of the rear section. To enable this, the front ends of the two pressings $d_1$ and $d_2$ are bent apart so that they grip the ring-shaped end $c_1$ of the front section on both sides; the wedge-shaped gap thus formed between the two ends of the pressings $d_1$ and $d_2$ is covered by a filling plate $d_3$ which is welded both to the pressings $d_1$ and $d_2$ and to the tubular end of the member $c$ to form a closed cross-section.

Moreover, the rear end of the front section $c$ is welded at the contact edges to the pressings $d_1$ and $d_2$ of the rear section.

If desired the front tapering end $c_2$ of the front section of the longitudinal member may be built up from two pressings corresponding to the rear longitudinal member section, so that the one-piece longitudinal member section $c$ is of uniform cross-section along its entire length.

Two embodiments of the further improvements are illustrated in Figs. 3 and 4.

Through the longitudinal member a tubular cross member $b$ extends having on the right, inner side $a^1$ of the longitudinal chassis member $a$ passage cross-section $D1$ and on the left, outer side $a^2$ of the longitudinal chassis member a smaller passage cross-section with a diameter $D2$. The cross member $b$ tapers from the $D1$ to $D2$ along the section $b'$ between the the two passage cross-sections.

In Fig. 4 the tubular cross-member $b$ tapers in outward direction from the diameter $D1$ to the outer smaller cross-section $D2$ along the intermediate section $b'$. The length $L$ of the tapered section $b'$ is shorter than the distance between the side walls $d_1$ and $d_2$ of the longitudinal chassis girder, so that the connection of these side walls of the longitudinal chassis member with the cross-member takes place at the cylindrical portions of the latter.

In both instances the cross-chassis member is welded to the walls of the longitudinal chassis member on its entire periphery at the passage points, so that a very stiff joint is obtained.

In a corresponding manner the cross-chassis member is connected with another longitudinal chassis member arranged symmetrically on the opposite side of the longitudinal central plane of the vehicle.

If, for example the cross chassis member is loaded on its middle portion (with diameter $D1$) the load will be taken up chiefly by the inner wall $a^1$ or $d_1$ of the longitudinal chassis member, whereas the outer wall $a^2$ or $d_2$ will be less heavily loaded.

For this reason the passage cross-sectional area of the outer wall $a^2$ or $d_2$ of the longitudinal chassis member may, as mentioned above, be smaller than the passage cross-sectional area of the inner wall $a^1$ or $d_1$.

Near the front end of the chassis (Figs. 1 and 2) the driving engine 3 and the change gear 4 are arranged, the change gear being unsupported and flanged to the engine 3, and the engine itself is rigidly connected with the longitudinal chassis members by lateral lugs 5. According to the invention the housing of the driving aggregate 3, 4 has, at the point 6 between engine and gear cases, a tunnel-like passage 7 (Fig. 1) through which the chassis cross member $b'$ located at this point extends freely. The tunnel-like passage 7 is closed at the bottom by a bridge 8 which supports the gear case 4 on the engine case 3. The bridge 8 is separately fitted and bolted (9) between the engine and gear cases. It may, however, be made in one piece either with the engine case or with the gear case.

The invention may be applied in such a manner that the chassis cross-member extends through a tunnel-like passage in the engine case, provided the constructional shape of the crank shaft and sump will allow.

Having now particularly described and ascertained the nature of my said invention and in what manner the same is to be performed, I declare that what I claim is:

1. A chassis for motor vehicles with tubular longitudinal members, comprising longitudinal members composed on the one hand of at least one practically straight section with tubular cross-section and on the other hand of a strongly bent section to form a closed cross-section, the end of the tubular section of the longitudinal member being introduced into the upwardly bent built-up section at an angle and welded thereto.

2. A chassis for motor vehicles with tubular longitudinal members, comprising longitudinal members composed on the one hand of at least one practically straight section with one piece tubular cross-section and on the other hand of a strongly bent section located in the range of one axle and which is formed of at least two pressings welded together in the longitudinal direction to form a closed cross-section, the end of the tubular section of the longitudinal member being introduced into the upwardly bent built-up section at an angle and welded thereto.

3. Chassis according to claim 2, characterized in that the two pressings forming the bent section of the longitudinal chassis member are bent apart at the point of connection with the one-piece tubular section of the longitudinal member for the introduction of the latter and the gap caused thereby is covered by a filling plate welded to the one-piece section and to the pressings of the built-up section of the longitudinal chassis member.

4. Chassis comprising hollow longitudinal and cross members, each transverse member extending through the two walls of each longitudinal member and tapering between the two walls of the longitudinal member so that on the side subjected to the heavier load, that is the inner side, it is of larger passage cross-sectional area than on the side subjected to the lighter load that is on the outer side.

5. A chassis according to claim 4, characterized in that the longitudinal member is of oval cross-section stood on edge and the cross member passing therethrough is of tubular cross-section.

6. A chassis according to claim 4, characterized in that the penetrating chassis member is welded on its entire periphery to the two walls of the penetrated member.

7. A chassis according to claim 4, characterized in that the length of the section of the chassis member tapering between the passage cross-sections is shorter than the distance between the two penetrated walls of the other chassis member.

8. In a vehicle chassis, a frame including in combination, two hollow longitudinal side members comprising in each case at least one practically straight unitary section and at least one strongly bent or arched multipartite section alined in the same vertical plane with at least one straight portion of the unitary section, at least one cross member passing transversely through one of said longitudinal members and tapering down in cross section within and between the side walls of the latter, with the portion of said cross member having the greater cross section located at the inner side wall of the longitudinal member which is subjected to the greater load and the portion of the cross member having the lesser or reduced cross section located at the outer or other side wall of said longitudinal member.

9. In a chassis for a vehicle the combination of a frame with two lateral hollow longitudinal members, each consisting of a substantially rectilinear hollow section and a strongly cranked hollow section which together constitute a longitudinal member, the portion of said cranked section adjacent to said rectilinear section being bent upward from said rectilinear section, the mentioned rectilinear section of said longitudinal member being inserted at an angle in said cranked section for the purpose of forming the connection with said cranked section of the longitudinal member.

10. A chassis for a vehicle according to claim 9, wherein the rectilinear section of the longitudinal member has a rounded sectional profile and the cranked section of said longitudinal member a substantially box-like hollow profile.

11. A chassis for a vehicle according to claim 9, in combination with a group of hollow transverse members, part of which group rigidly connects to each other the rectilinear sections of the longitudinal members, and another part of said group the cranked sections of said longitudinal members.

12. A chassis for a vehicle according to claim 9, in combination with a group of substantially rectilinear hollow cross members, part of which group rigidly connects the rectilinear sections of the longitudinal members to each other and another part of said group the cranked sections of said longitudinal members.

13. A chassis for a vehicle according to claim 9, in combination with a group substantially rectilinear hollow transverse members, a part of which group rigidly connects the rectilinear longitudinal sections of the longitudinal members to each other and another part of said group the cranked sections of the longitudinal members, the rectilinear sections of said longitudinal members and the transverse members each having a one-part hollow profile and the cranked sections of said longitudinal members having a hollow profile consisting of several parts.

14. In a chassis for a vehicle, the combination of a frame with two hollow longitudinal members, each comprising a substantially rectilinear section of a longitudinal member and a strongly cranked section of the longitudinal member alined and connected with it and having a box-like sectional profile, the substantially rectilinear section having a rounded hollow sectional profile, and the strongly cranked section having a box-like hollow profile, and the two sections of said longitudinal member being united, with the rectilinear section introduced into the end of the strongly cranked section and said two sections welded together at the point where they are connected.

15. A chassis for a vehicle according to claim 14, wherein the hollow profile of the substantially rectilinear section of the longitudinal member consists of one part, and the box-like hollow profile of the cranked section of said longitudinal member consists of several parts.

16. In a vehicle chassis, a rigid frame having two hollow longitudinal side members comprising in each case at least one substantially rectilinear unitary section and at least one strongly bent or arched multipartite section aligned in substantially the same vertical plane with at least one rectilinear portion of the unitary section, the portion of the arched section located at the point of attachment to the rectilinear section being disposed substantially at an obtuse angle thereto, and said arched section and said rectilinear section mutually partly engaging one in the other and being rigidly connected together at their mutually adjacent ends.

17. A chassis for a vehicle according to claim 16, having a group of distinct transverse members each with one-part hollow profile, one part of which group rigidly connects the substantially rectilinear sections of the longitudinal members, another part of said group the strongly cranked sections of said longitudinal members.

18. A chassis for a vehicle according to claim 16, having a group of distinct rectilinear transverse members rigidly connecting the longitudinal members and made with a hollow profile in one portion of each.

19. A chassis for a vehicle comprising a frame having two lateral longitudinal members which are at least partly substantially rectilinear, a group of distinct and substantially rectilinear transverse members which connect the longitudinal members to each other rigidly substantially in the plane of the rectilinear portions of said longitudinal members so as to provide for a drive housing block being disposed between the substantially rectilinear portions of said longitudinal members and in their plane in a position allowing at least one of the transverse members to extend through tunnel means in said drive housing block with clearance, and means for mounting the block of the drive housing on the frame independently of the one transverse member extending through said transverse passage.

20. A vehicle chassis according to claim 16, having one end of the composite subdivided walls of the multipartite section of the composite longitudinal member embracing from the outside the end of the one-part section facing the same, and being rigidly welded thereto.

21. In a vehicle chassis, a frame according to claim 16, having the portion of the arched section located at the point of attachment to the straight section disposed directly at an obtuse angle to the latter.

22. A chassis for a vehicle according to claim 19, having the transverse members welded to said longitudinal members, in combination with means for allowing of mounting said drive housing block from above to said chassis.

23. In a vehicle chassis, a rigid frame having two hollow longitudinal side members comprising in each case at least one substantially rectilinear unitary section and at least one strongly bent or arched multipartite section aligned in substantially the same vertical plane with at least one straight portion of the unitary section, in combination with means for mounting a drive housing block on a substantially level portion of the frame between the rectilinear sections of said longitudinal members, and a group of transverse members connecting the sections of said longitudinal members rectilinearly to each other so as to allow at least one of said transverse members to extend through a tunnel-shaped transverse passage in the block of the drive housing with clearance.

24. In a chassis for a vehicle, the combination of a frame having longitudinal and transverse members welded together, a drive housing block mounted on said chassis, disposed between said longitudinal members and having a tunnel-shaped transverse passage which is open at the bottom and through which one of said welded transverse members extends with clearance, and a detachable cover closing said tunnel-shaped transverse passage from below.

MAX WAGNER.